United States Patent [19]

Henderson

[11] Patent Number: 4,588,557

[45] Date of Patent: May 13, 1986

[54] OIL TUBE POSITIONER FOR RADIAL OIL CARBON BLACK REACTION

[75] Inventor: E. Webb Henderson, Bartlesville, Okla.

[73] Assignee: Phillips Petroleum Company, Bartlesvillea, Okla.

[21] Appl. No.: 624,314

[22] Filed: Jun. 25, 1984

[51] Int. Cl.$^4$ .................... C09C 1/48; F23C 5/06; F23N 5/24

[52] U.S. Cl. .................... 422/108; 422/117; 422/150; 422/156; 423/450; 423/DIG. 5; 431/89; 431/189

[58] Field of Search ............ 422/108, 117, 150, 156, 422/157; 423/450, 456, 457, DIG. 5; 431/89, 186, 189

[56] References Cited

U.S. PATENT DOCUMENTS

| | | |
|---|---|---|
| 2,851,337 | 9/1958 | Heller . |
| 2,976,127 | 3/1961 | Latham, Jr. . |
| 3,038,788 | 6/1962 | Pennington et al. ............ 422/150 |
| 3,057,695 | 10/1962 | Osburn, Jr. ............ 422/150 |
| 3,165,522 | 1/1965 | Bye ............ 422/117 |
| 3,460,911 | 8/1969 | Krejci et al. . |
| 3,467,502 | 9/1969 | Davis ............ 422/150 |
| 3,615,242 | 10/1971 | Anderson ............ 422/150 |
| 4,093,705 | 6/1978 | Kraus et al. . |
| 4,106,912 | 8/1978 | Dollinger et al. . |
| 4,251,221 | 2/1981 | Austin . |

FOREIGN PATENT DOCUMENTS 514816  7/1955  Canada ............ 422/150

Primary Examiner—S. Leon Bashore
Assistant Examiner—K. M. Hastings
Attorney, Agent, or Firm—John R. Casperson

[57] ABSTRACT

In order to prevent burn-off of a radial feedstock nozzle in a carbon black reactor, resulting when the feedstock stopped flowing through the nozzle, a preselected minimum temperature of the feedstock tube actuates a mechanism to withdraw the feedstock from the hot zone of the reactor.

11 Claims, 4 Drawing Figures

OIL TUBE POSITIONER FOR RADIAL OIL CARBON BLACK REACTION

FIELD OF THE INVENTION

The invention pertains to the avoidance of burnout of oil feedstock nozzle in a carbon black reactor. In one aspect, the invention pertains to an apparatus to minimize burnout of a feedstock nozzle in a carbon black reactor. The invention further pertains to methods responsive to temperature sensing to withdraw feedstock nozzles from a carbon black reactor, and apparatus for same, when oil-flow through the oil feedlines slows or is impeded. In another aspect, the invention pertains to apparatus to position feedstock nozzles within a carbon black reactor.

BACKGROUND OF THE INVENTION

Oil feed to a carbon black reactor employs a plurality of oil injection tubes, radially positioned around the reactor shell and perpendicular relative to the reactor, and with nozzles projecting into the carbon black reactor. Positioning of the tubes heretofore has been by hand, requiring a considerable expenditure of time, effort, and skill.

Traces of undesirable components in the oil feed, such as grit and the like, tend to cause the nozzles to plug, particularly when the nozzles have relatively small orifices, generally only about 0.01 to 0.1 inch, such as about 0.046 inch, in diameter. When an individual nozzle plugs or partially plugs, the portion of the corresponding tube extending into the reactor can burn out very quickly due to the exceedingly high temperatures encountered in the normal mixing zone of injection. Tube burnouts occur far faster than a human being can react, even assuming that an operator is alerted to the plugging.

BRIEF DESCRIPTION OF THE INVENTION

In accordance with one aspect of my invention, feedstock injectors for fuel oil are equipped with positioning means such that any one, preferably all, are mechanically positionable according to a determined set-depth.

In one embodiment of my invention, each feedstock injector is individually responsive to a sensor, such as a temperature sensor, which determines whether the temperature of the oil injector tube is or is not proper. If the temperature of the injector tube falls below a certain predetermined value, as it will when the flow of preheated hot oil in the tube is reduced, the sensor signals to effect automatic withdrawal of that injector from the hot zone, thus avoiding burnout.

In an alternate embodiment of my invention, each feedstock injector assembly is individually responsive to a detector, such as a flow detector, which determines whether the rate of flow of the hot fuel oil in the injector tube is or is not proper. If the flow rate is restricted or ceases, as it will due to line or orifice plugging, or due to pump failure, thus falling below a predetermined set value, then the detector signals to effect automatic withdrawal of that injector from the hot zone, thus avoiding burnout.

In another embodiment of my invention, the common feed line, which feeds oil to all of the individual feed stock assemblies, is responsive to a flow detector which monitors the rate of flow of the fuel oil, which in normal reactor operation is held at a quite constant level. If the total rate of flow of the oil falls below a predetermined set value or ceases, as it will when one or more orifices plug or when the feed pump fails, automatic simultaneous withdrawal of all injectors from the hot zone is effected, resulting in complete shut-down of the entire operation.

It is an object of my invention to provide, in the context of a carbon black reactor, means to withdraw any one or all of the several feedstock injector assemblies. It is another object of my invention to provide means for positioning any one or all of the feedstock individual injector assemblies in an oil fed carbon black reactor. A further object of my invention is to provide methods for the proper depth-positioning of oil feed nozzles within the carbon black reactor. Among the objects of my invention is a method of withdrawal of one or more oil injection tube-nozzle assemblies in response to an indication of impedance to oil flow.

DETAILED DESCRIPTION OF THE INVENTION

My invention is described in further detail with particular reference to the aspects as shown in my several drawings. My invention is not limited to the specific embodiments so drawn or described. Rather, the descriptions and illustrations should be understood by those skilled in the art as being illustrative of my overall invention in its several aspects and not limitative of the scope thereof.

For purposes of illustration herein, the description centers around injection assemblies positioned generally perpendicular to the carbon black reactor, and spaced from each other. However, tangential placement, or angular placement, relative to the reactor shell, is equally feasible, and such so-placed assemblies are readily positioned in accordance with my invention.

Figure 1:
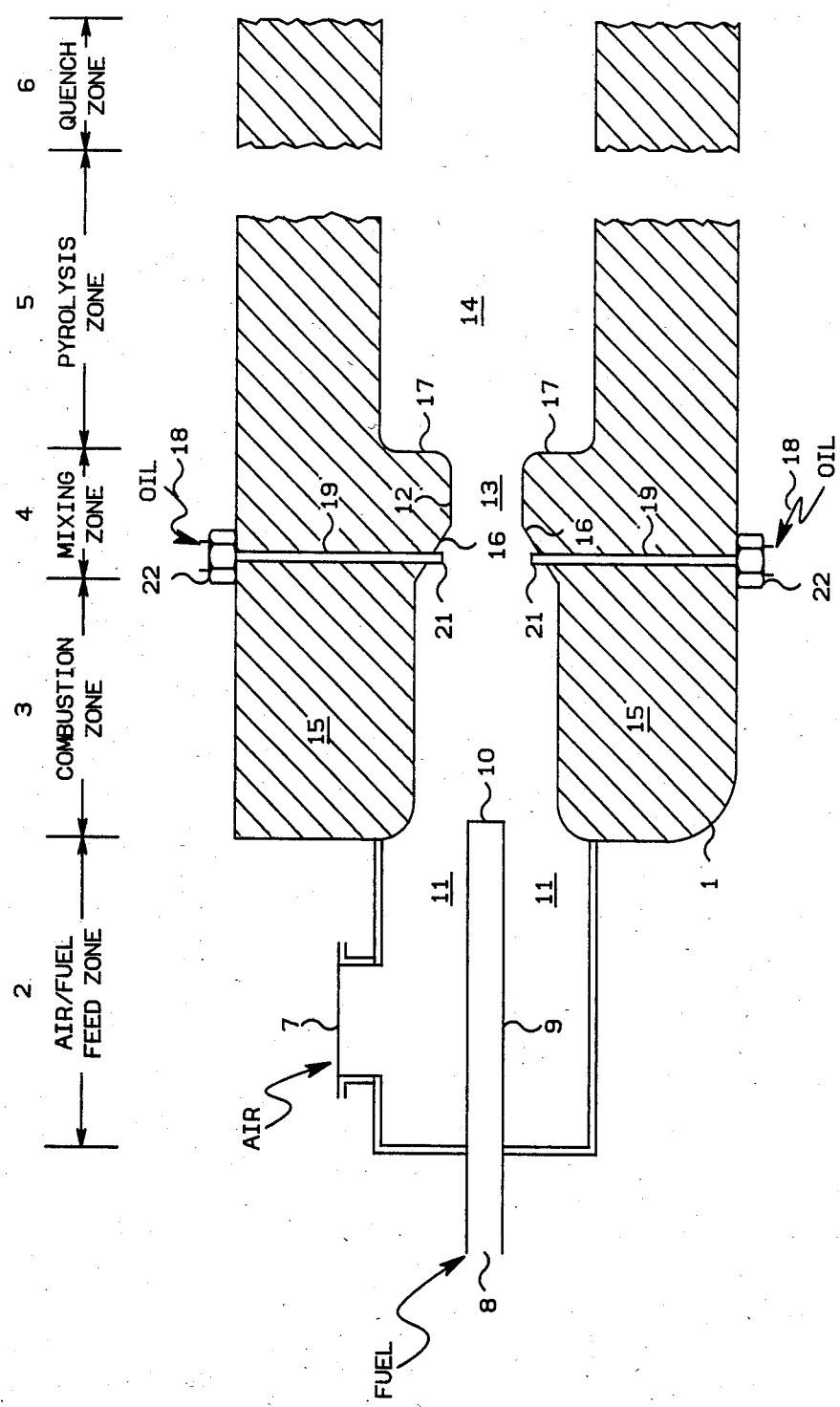
FIG. 1 shows in cutaway view one type of carbon black reactor 1 to which my invention is applicable, and illustrates the relative sequence of the respective zones for air/fuel feed 2, combustion zone 3, mixing zone 4 of hot combustion products and make-oil, pyrolysis zone 5, and quench zone 6. My positionable radially perpendicularly-placed make-oil feed tubes are shown as 19.

FIG. 1, shows in cut-a-way view a carbon black reactor 1, including air-fuel feed zone 2, combustion zone 3, mixing zone 4, pyrolysis zone 5, and quench zone 6. The downstream end of the carbon black reactor including black recovery means, packaging means, and the like, is not shown, since such do not pertain to my invention.

To the air-fuel feed zone 2 is fed air 7, and fuel 8 such as gas or fuel oil. Fuel 8 is fed to the reactor air-fuel feed zone 2 through the air-fuel feed zone 1 through an elongated, axially positioned, fuel tube 9 which usually terminates at its extended end 10 near the boundary 11 of feed zone 2 and combustion zone 3 of the reactor.

The combustion zone 3, mixing zone 4, 13, pyrolysis zone 5, 14, etc., are formed of appropriate refractory ceramic shell 15, as known in the art, and constructed to define the respective zones in suitable relative internal diameters and length configurations, such as shown though many configurations are known in the black arts. The mixing zone 4, 13 generally is constructed as a zone of progressively decreasing diameter 16, usually terminating in an abrupt change of increased diameter 17 to form the pyrolysis zone 5, 14, such as shown.

Preheated carbon black make-oil 18 is fed in appropriate quantity, amount, and rate by a plurality, e.g., four to six, of feedstock injector assemblies 19 suitably positioned in spaced relationship relative to each other around the shell, preferably equiangularly in a hard black reactor, and extending through the shell 15, each terminating with a nozzle 21, sealably slidably positioned by a suitable packing gland means 22, and adjustably positionable so as to inject make-oil into the mixing zone 13. The carbon black forming oil 18 often is termed the "make-hydrocarbon" or "make-oil". The injection assemblies 19 normally are jacketed (not shown) and cooled with steam or air, as is known in the art.

Each injection assembly basically comprises: an oil receiving end to which make-oil is conveyed and which is positioned outside of the reactor shell or casing; an oil-discharging end equipped with a suitable type of oil nozzle means for spraying oil into the mixing zone, and which in normal reactor operation protrudes slightly into the mixing zone; an oil conveying means such as a tube or pipe connecting said ends; the whole assembly generally being movably positionable within a casing perforating the shell and ceramic, and the feed assembly being movable responsive to automatic orders from suitable control or sensing equipment so as to be readily moved inwardly or withdrawn outwardly as may be desired or required by the reactor operation. The controls can be responsive to precisely set and reset the depth of penetration of the nozzles; and fully automatic in response to sensors so as to pull back the assemblies promptly to avoid burnout as may be required.

Figure 2:
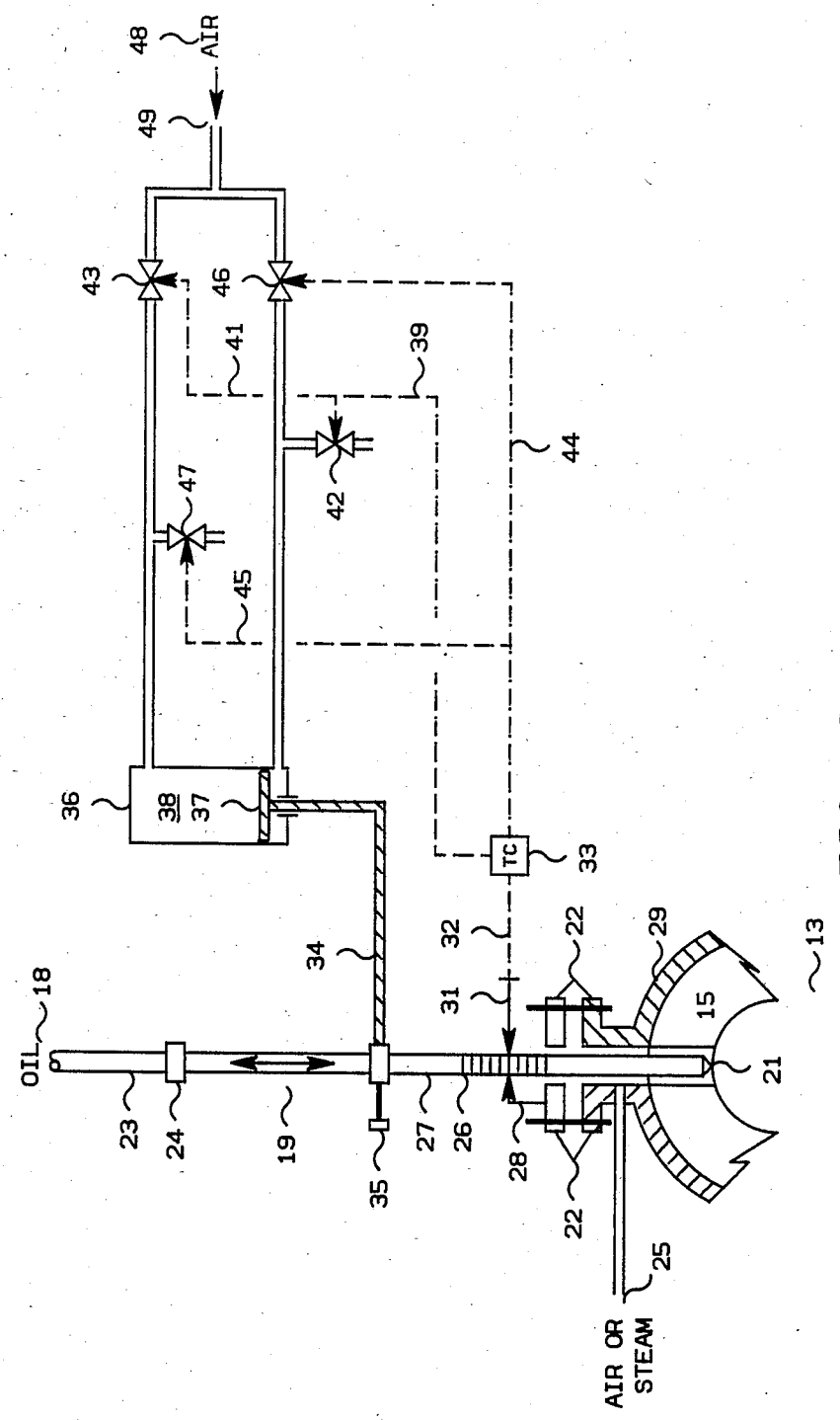
FIGS. 2, 3 and 4 show variations in the positioning and control of my make-oil feed tube 19.

FIG. 2 shows in more detail an adjustably positionable make-oil feed assembly 19 in accordance with one aspect of my invention.

Preheated make-oil 18 is fed through a conveying line 23, preferably flexible, connected by means of connecting means 24 to one of the axially positioned oil feed injector assemblies 19, each positioned generally perpendicularly with relation to and extending seals 22 through ports through the ceramic reactor shell 15 into the mixing zone 13. These injection means can be positioned directly perpendicularly (relative to the reactor zone 4) into the converging chamber 4, or positioned to inject make-hydrocarbon upstream, downstream, or by means of various configurations, including axially or radially directed injection methods. The make-oil 18 discharges through nozzle 21 into the mixing zone 13. Air or steam introduced 25 into the annulus around the nozzle shaft helps cool nozzle 21 when the nozzle is exposed to the higher temperatures in mixing zone 13.

The depth of insertion through shell 15 or of projection in zone 13 of the injector assembly 19 and nozzle 21 can be calibrated such as by appropriate markings 26 on shaft 27. For example, fixed pointer 28 can be mounted as convenient in a fixed manner, such as on the shell 29 or on the packing gland assembly 22, so as to provide a reference point. Temperature sensor 31 is positioned so as to detect the temperature of shaft 27, which thereby will reflect the temperature of the make-oil contained therein. Temperature sensor 31 is signally connected 32, by signal-conducive means such as electrical lines, pneumatic lines, or radio communication means, to a suitable temperature controller means 33. The injector assembly 19 shaft 27 is operably connected 34 such as by a shaft by suitable fastening means 35 such as a clamp to positioning means suitable and effective to move shaft 27, inwardly or outwardly relative to the reactor, such as by cylinder means 36 as shown including piston 37 in cylinder bore 38.

At the start of the operation, preheated feed oil 18 is introduced through feed line 23 into my adjustably positionable make-oil injection assembly 19. Until a certain predetermined temperature is attained at the oil temperature monitoring site of temperature sensor 31, signals are transmitted from temperature controller means 33 via signal-conducive transmission means such as 39 and 41 so as to actuate and close air flow control means such as two-way air valves 42 and 43, and via signal communication means 44 and 45 so as to actuate and open air flow control means such as two-way air valves 46 and 47. Air 48 flows through air inlet 49 through now open air flow control means such as air valve 46 into assembly positioning adjustment means such as air cylinder 36 and pushing piston 37 with attached 34, 35 nozzle assembly 19 perpendicularly outwardly relative to the carbon black reactor, and then exits through air flow control means such as air valve 47.

When the temperature of the shaft as sensed by sensor means 31 reaches a desired certain predetermined value, i.e. the preheated oil flows at a desired flow rate, temperature controller means 33 sends signals via signal-conducive transmission means, such as lines 39 and 41, to actuate and open air flow control means, such as air valves 42 and 43, and sends signals via signal-conducive transmission means, such as lines 44 and 45, so as to actuate and close air flow control means, such as air valves 46 and 47. Air flows through now open air flow control means, such as air valve 43, into assembly positioning adjustment means, such as air piston cylinder 36, pushing piston 37 with attached 34, 35 oil feed assembly 19 inwardly perpendicularly relative to the carbon black reactor, and then exits through now open air flow control means, such as air valve 42. The oil feed assembly 19 thusly is positioned such that oil nozzle 21 extends slightly into the mixing zone 13 at a desired depth of penetration.

In another aspect, not illustrated, the positionable assemblies can be positioned by control modes responsive to depth selective controllers to initially position the nozzles at desired set-depths regardless of initial make-oil temperatures.

If or when the temperature of the shaft as sensed by sensor means 31 drops below a determined certain control level, as it will for example because of reduced flow of hot make-oil, e.g. due to leaks or pump failure, or for any other cause, the control mechanism described hereinabove for the start of the operation responds. Air 48 flows 49 through now open air flow control means, such as air valve 46, and pushes assembly positioning adjustment means, such as air piston 37 along with attached 34, 35 oil feed assembly 19 perpendicularly outwardly relative to the carbon black reactor, thus pulling nozzle 21 out of the high temperature mixing zone and thus avoiding burn-out.

Figure 3:
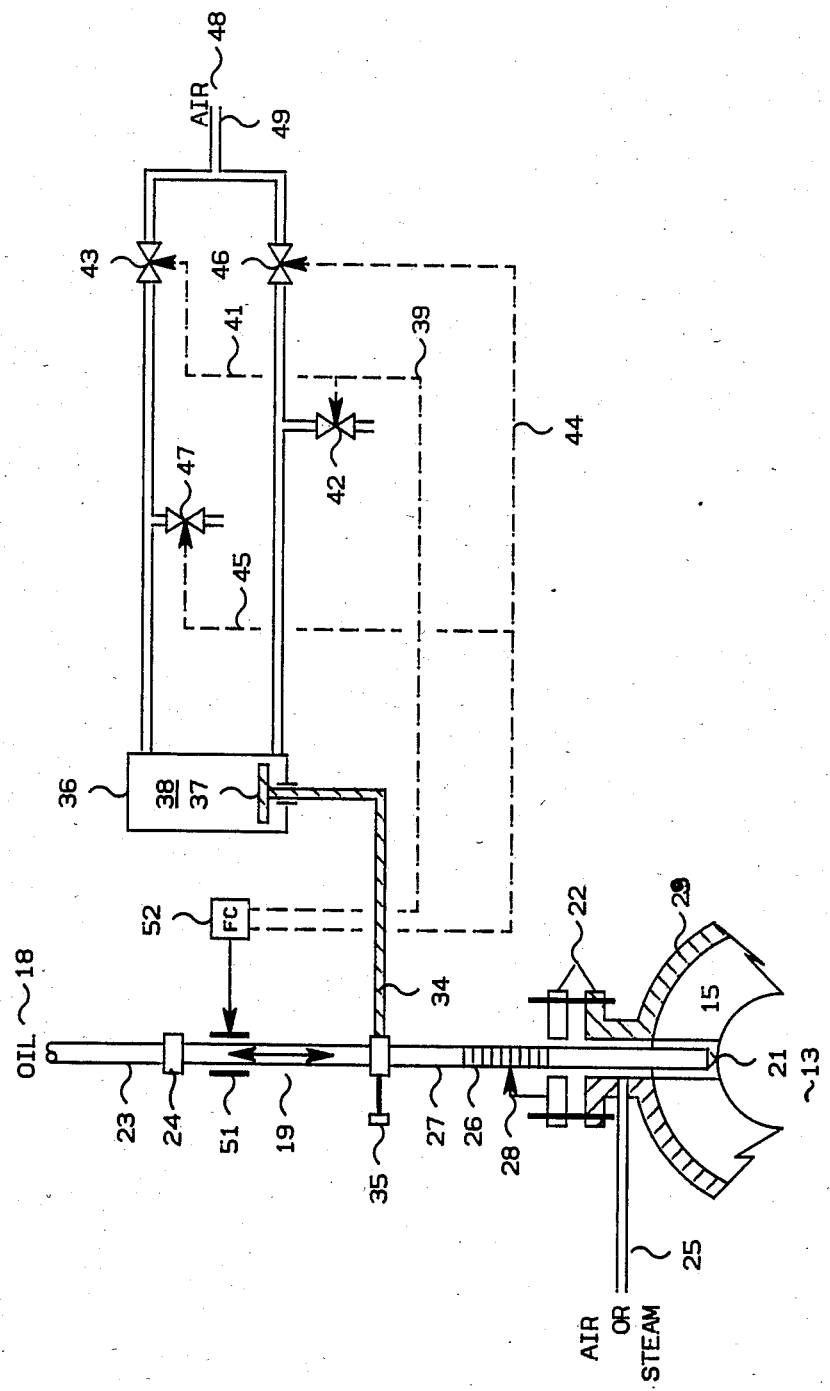

FIG. 3 shows another aspect of my positionable feed assembly 19, similarly as shown in FIG. 2, with two primary exceptions. Temperature sensor means 31 and temperature controller means 33 of FIG. 2 are replaced respectively with flow-rate indicator-sensor means 51 and with flow controller means 52. At the start of the operation or whenever the flow rate of preheated make-oil 18 falls below a certain predetermined value as detected by flow-rate sensor detector means 51, flow controller means 52 transmits suitable signals via signal-transmissive means, such as signal lines 39 and 41, so as to actuate and close air flow control means, such as air control valves 42 and 43, and further provides suitable signals via signal-conducive means, such as lines 44 and 45, so as to actuate and open air flow control means such as air valves 46 and 47. Air 48 flows 49 through now open valve 46, pushes piston 37 with operably attached 34, 35 make-oil feed assembly 19 outwardly relative to the reactor, and then exits through open valve 47, thusly withdrawing feed nozzle 21 from the very hot mixing zone and avoiding tube/nozzle burnout.

When a predetermined make-oil 18 feed flow rate is attained as determined by sensor means 51, flow controller means 52 transmits suitable signals via signal-conducive means, such as signal lines 39 and 41, so as open air flow control means, such as air valves 42 and 43, and further transmits signals, such as via lines 44 and 45, so as to actuate and close air flow control means such as air valves 46 and 47. Air 48 further flows 49 through now open air flow control means valve 43, pushes injector positioning means piston 37 with attached 34, 35 nozzle assembly 19 inwardly relative to the reactor, and exits through open air flow control means valve 42.

Figure 4:
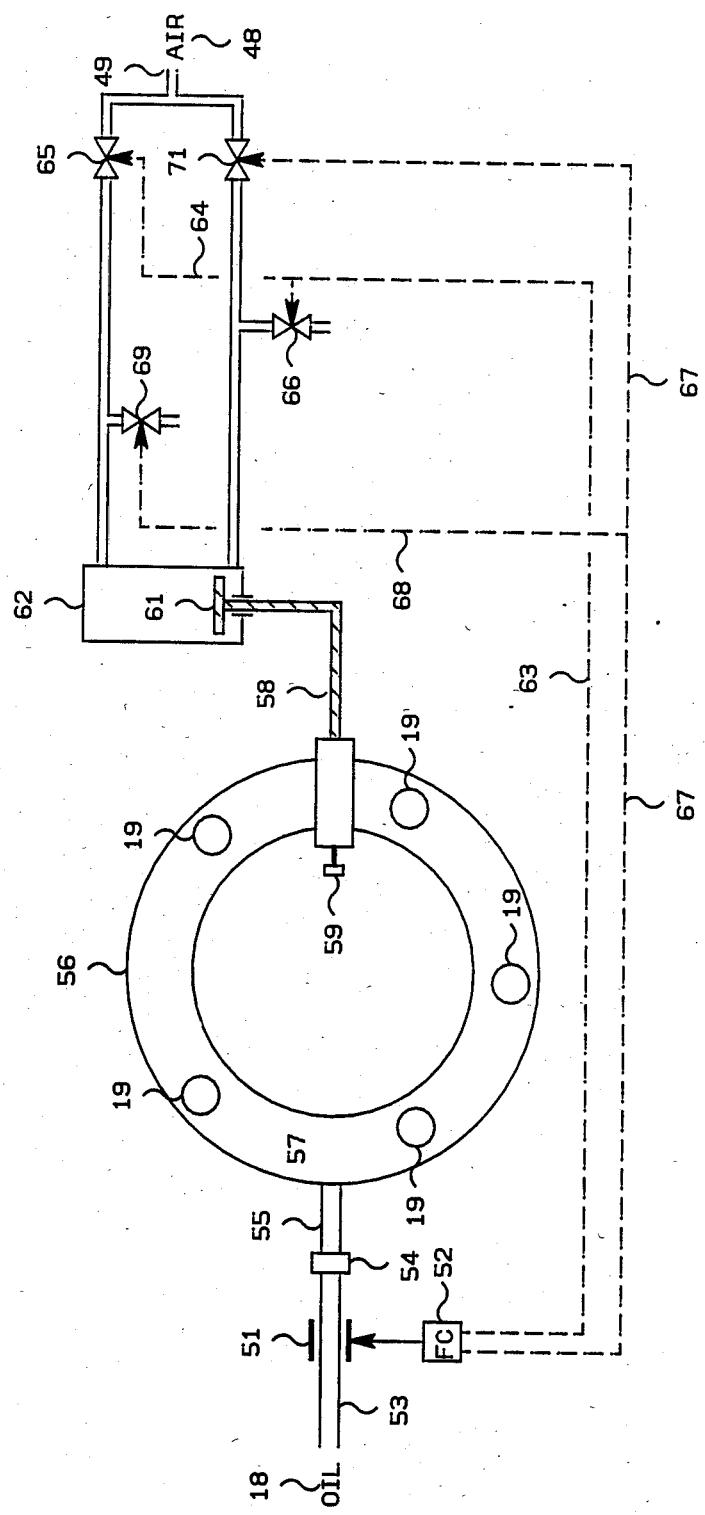

FIG. 4 illustrates a further embodiment of my invention. Make-oil 18 is fed through stationary feed line 53 operably equipped with a flow-rate sensor means 51 monitoring rate of flow of oil therethrough and flow controller means 52. The primary make-oil feed line 53 is connected by connecting means, such as a hose coupler 54, to make-oil flexible hose 55 so that the make-oil flows into manifold 56 annulus ring 57, which provides distribution of the make-oil to a plurality, e.g. five shown as exemplary, individual feed assemblies 19. The manifold 56 is operably connected 58 by suitable adjustment means such as a mechanical expander 59 to manifold positioning means, such as piston means 61 in cylinder 62.

When the total make-oil 18 flow in tube 53 as detected by flow rate monitor sensor means 51 drops below a predetermined certain rate, due for example to blockage of one or more injection nozzles, or stops completely, due for example to pump failure, flow controller means 52 transmits adjustment signals via signal-conducive means 63 and 64 so as to actuate and close air flow control means, such as air valve means 65 and 66, and further transmits suitable signals via signal-conducive means, such as 67 and 68, so as to actuate and open air flow control means, such as air valves 69 and 71. Air 48 flows from inlet 49 through now open air flow control means, such as air valve 71, into injector assembly positioning means, such as cylinder means 62 pushing positioning means, such as piston 61, and causing attached 58, 59 manifold 57 to withdraw oil feed assemblies 19, and then exits through now open air flow control means such as air valve 69.

The detail of the manifold 56 is not shown since various mechanical/pneumatic/electrical or combination arrangements are feasible. In one aspect, the annulus within the manifold ring 57 represents a cross-section of the carbon black reactor, with oil feed assemblies 19 spaced equiangularly therearound. Upon appropriate signal, all assemblies are moved inwardly or outwardly mechanically, by small electrical motors, or by pneumatic devices. Alternatively, the manifold can be an expandable-retractable type.

When the make-oil 18 flow rate as determined by flow sensor means 51 attains a predetermined desired value, flow controller means 52 transmits signals via signal transmission means, such as lines 63 and 64, so as to actuate and open air flow control means such as valves 65 and 66 and further appropriately signals, such as by signal transmission means such as via lines 67 and 68, so as to actuate and close air flow control means, such as air flow valves 69 and 71. Air 48 flows 49 through now open air flow control means valve 65, pushes piston means 61, which actuates 58, 59 manifold 56 in reverse operation, and then exits through open air flow control means valve 66. When manifold 56 is so actuated, so actuated also are the plurality of feed assemblies 19, and feed nozzles 21 thus are slightly properly extended in suitable position into the hot mixing zone (see FIGS. 1, 2, and 3).

A further option, not shown, is the installation of a temperature sensor in the main make-oil feed line 53, and with temperature sensor/controller means in lieu of a flow indicator/controller means 52. This option of a temperature sensor presently is considered to be less preferred than the flow controller shown in FIG. 4, since the response time to a temperature rise expectedly would be somewhat longer. It would be expected to take some interval of time for the temperature of the feed line to drop because of more slowly moving oil, which means a higher lag time in response. Even though the time were very short, still the burnout time might be reached.

Employing my invention, the carbon black reactor comprises, serially or sequentially arranged, in operable conjunction, a combustion zone, a mixing zone, a pyrolysis zone, and a quench zone, followed by usual recovery procedures for the produced carbon black as known in the art, such as bag filters, and the like.

The combustion zone comprises a combustion chamber defined by a generally cylindrical sidewall with a generally annular upstream end wall having a passage therethrough axially directed into a cylindrical combustion chamber. The sidewalls and end walls of the combustion zone are formed from refractory materials suitable for use at very high temperatures.

An oxidant gas, such as air, and a combustible fluid, usually natural gas, waste gases, fuel oil, or even carbon black make-oil, or mixtures, are introduced into and through the feed zone and into the combustion zone. Usually, the combustible fluid is fed by means of a tubular member extending through the feed zone into the combustion zone and axially aligned therewith. The combustible fluid is mixed with the oxidant gas from the feed zone.

The mixing zone generally comprises a sidewall formed from refractory defining a chamber in axial alignment with and converging from the combustion zone to a throat area wherein means are positioned for introducing a carbonaceous feedstock (carbon black make-hydrocarbon), through the sidewall and into the converging chamber and throat.

Generally, the internal reactor configuration is such that the flow passage decreases in diameter between the combustion zone and the mixing zone, and then expands abruptly as the hot flowing gases pass from the mixing zone into the pyrolysis zone.

The means for introducing the make-hydrocarbon comprise a plurality of ports extending through the refractory lining and opening into the converging chamber. A series of such ports are positioned circumferentially spaced about the reaction or flow passage at selected positions with respect to the longitudinal axis of the reaction flow passage. The ports preferably are equiangularly spaced from each other so as to provide for uniform distribution of feedstock by means of the injectors into the reaction flow passage.

Each port is equipped with an injection means for feeding of the make-hydrocarbon. The injection means are precisely, automatically, repeatably positionable in accordance with my invention.

The injection means are provided at one end with oil-receiving means generally outside of the reactor shell, and at the opposing end with oil-discharging means such as nozzles, with heat-resistant, generally tubular oil transmission line therebetween, in which the nozzles can be canted to introduce carbonaceous feedstock into the reaction flow passage with an upstream or downstream velocity component as may be desired for production of various types of carbon blacks. The nozzles can be selected to introduce the feedstock as a coherent stream or a spray or various other patterns as may be preferred by the carbon black practitioners.

The pyrolysis zone, following quench zone, and carbon black recovery means, are well known in the art and need not be further described.

The disclosure, including drawings, has illustrated the value and effectiveness of my invention. The description, and the knowledge and background of the field of the invention and of applicable sciences, have formed the bases for my claims here appended.

I claim:

1. In a carbon black reactor apparatus for producing carbon black, said apparatus comprising a shell which defines a feed zone, a combustion zone, a mixing zone, and a quench zone; at least one make-hydrocarbon oil injection assembly extending through the shell of the carbon black reactor, each said at least one oil injection assembly comprising a tubular member having an oil receiving end and an oil discharging end and a spray nozzle on the oil discharging end of the tubular member; a source of oil; a conduit connecting the source of oil with the oil receiving end of the tubular member; the improvement comprising: a sensor means adjacent said oil injection assembly for detecting a value indicative of impedance of the oil flow through said assembly and generating a signal in relationship to said value; a controller means for processing the signal; a means for transmitting the signal from the sensor means to the controller means; and an adjustment means coupled to the controller means for moving said nozzle assembly inwardly or outwardly in relation to the position of the nozzle assembly with respect to said shell in response to said signal in order to prevent spray nozzle burnout.

2. The apparatus of claim 1, wherein said sensor means are flow-rate sensing means and said value is the flow-rate of said make-hydrocarbon oil.

3. The apparatus of claim 1, wherein said sensor means are temperature sensing means and said value is the temperature of said make-hydrocarbon oil.

4. The apparatus of claim 1, further comprising a manifold for receiving said make-hydrocarbon oil, and said manifold provides make-hydrocarbon oil to a plurality of said oil injection assemblies.

5. The apparatus of claim 1, wherein each said oil injection assembly comprises individual feedstock assemblies and is individually positionable.

6. The apparatus of claim 1 wherein all said feedstock assemblies are positionable as a group.

7. In a carbon black reactor apparatus comprising: a shell which defines a feed zone, a combustion zone, a mixing zone, and a quench zone; a plurality of make-hydrocarbon oil feed assemblies each formed from a tubular member having an oil receiving end and an oil discharging end, the oil discharging end positioned to discharge in the mixing zone of the carbon black reactor; a source of oil; and a conduit connecting the source of oil with the oil receiving end of the tubular member; an improvement for automatically adjusting the position of the make-hydrocarbon oil feed assemblies, said improvement comprising a sensing means adjacent to said oil feed assemblies for detecting a value indicative of impedance of the oil flow through said oil feed assemblies and generating a signal in relationship to said value; a controller means for processing the signal; means for transmitting the signal from the sensor means to the controller means; and an adjustment means coupled to the controller means for moving said oil discharging end of said oil feed assembly inwardly or outwardly with respect to said mixing zone in response to said signal in order to prevent feed assembly burnout.

8. The apparatus of claim 7, wherein said sensor means are flow-rate sensing means and said value is the flow-rate of said make-hydrocarbon oil.

9. The apparatus of claim 7, wherein said sensor means are temperature sensing means and said value is the temperature of said make-hydrocarbon oil.

10. The apparatus of claim 7 wherein each said assembly is individually positionable.

11. The apparatus of claim 7 wherein all said assemblies are positionable as a group.

* * * * *